United States Patent Office 3,554,059
Patented Jan. 12, 1971

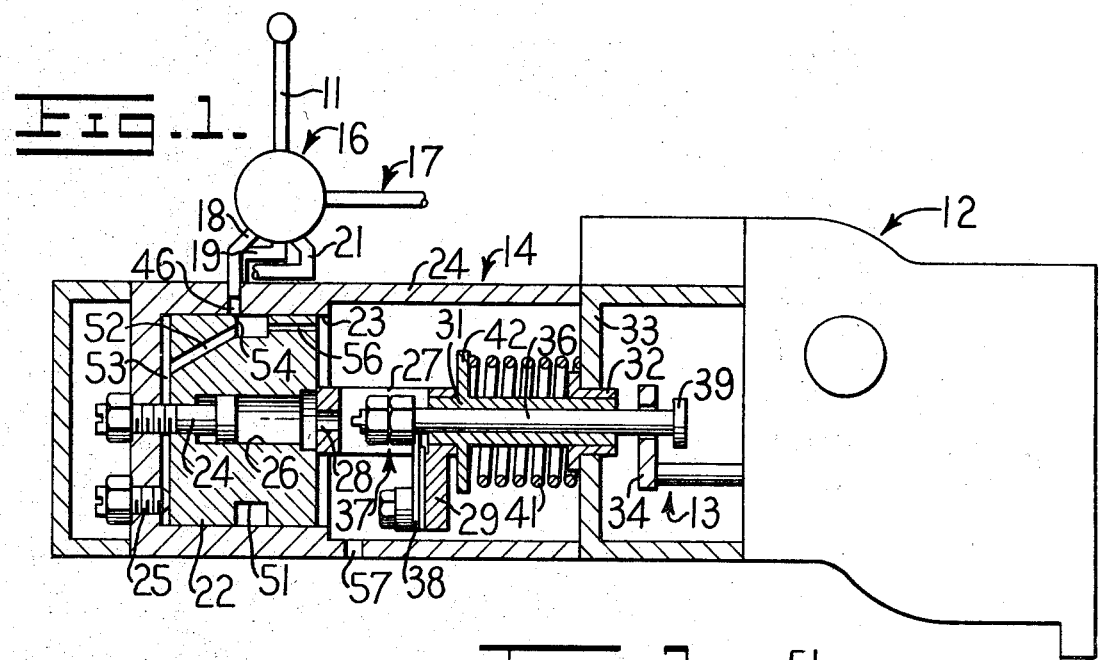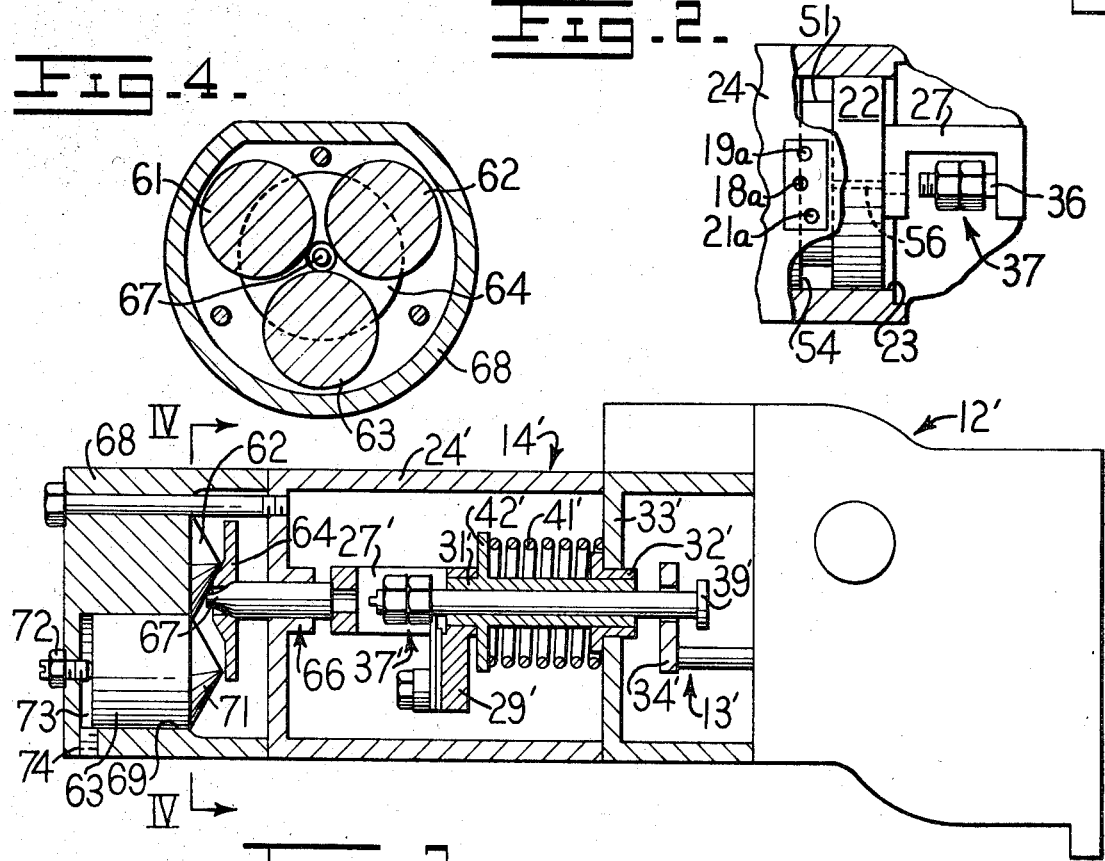

3,554,059
VARIABLE GOVERNOR CONTROL
John H. Parks and Robert H. Miller, Peoria, Ill., assignors to Caterpillar Tractor Co., Peoria, Ill., a corporation of California
Filed Sept. 6, 1968, Ser. No. 758,001
Int. Cl. B60k 21/02; F15b 9/02
U.S. Cl. 74—860                                         5 Claims

ABSTRACT OF THE DISCLOSURE

Variable control apparatus which is responsive to drive ratio selection of a transmission for adjusting the setting of an engine governor and thus varying normal engine power.

---

The present invention relates to a variable governor control and more particularly to a variable control for adjusting the governor power setting in response to drive ratio selection of a transmission associated with the governor-regulated engine.

In many applications for engine and transmission assemblies, a governor is employed for establishing normal operating speed and power of the engine. Governor-regulated engines are commonly employed in draft vehicles such as farm implements and earthmoving equipment. Maximum available power output is desired during higher speed range settings or drive ratios of the transmission but is normally unnecessary and only poses a problem during operation in the lower speed ranges of the transmission. Various drive components associated with the engine are commonly strengthened to withstand maximum engine output during lower speed range operation. Adjustment of the governor for limiting normal output of the engine during lower speed range operation would permit simplification and reduction of cost within the drive train. However, requiring an operator to manually adjust the governor setting would reduce operating efficiency by drawing his attention away from operating controls for the vehicle or associated equipment.

Accordingly it is an object of the present invention to provide means for automatically adjusting the governor setting of an engine in response to drive ratio selection in an associated transmission.

Other objects and advantages of the invention are made apparent in the following description having reference to the accompanying drawing.

In the drawing:

FIG. 1 is a view with parts in section of the present variable control in association with portions of a governor regulated engine and transmission;

FIG. 2 is a fragmentary view taken from the top of FIG. 1, with parts in section to illustrate a fluid responsive piston and fluid inlet ports within the variable control of FIG. 1;

FIG. 3 represents and alternate embodiment of the variable control of FIG. 1; and FIG. 4 is a view taken along section lines IV—IV of FIG. 3.

Referring now to FIG. 1, a transmission has various operating positions for establishing the speed range or output drive ratio of a governor-regulated engine represented by a portion of its governor which is indicated at 12. The governor 12 has a variable fuel pump rack 13 for controlling the flow of fuel through a pump (not shown) and thus regulating normal engine speed and power. As shown in FIG. 1, rightward shifting of the fuel pump rack 13 tends to increase normal engine operating speed and power. A variable control 14 is provided by the present invention in association with the transmission control lever 11 and with the fuel pump rack 13 of the governor 12 to automatically adjust the governor setting and vary normal engine operating power according to the drive ratio selected by the transmission control lever 11.

In a first embodiment of the invention as illustrated in FIGS. 1 and 2, a fluid valve 16 is controlled by the transmission control lever 11 and has a hydraulic fluid inlet 17. For regulating a typical transmission, the control lever 11 has five operating positions including neutral and four speed ranges of different drive ratios.

In a preferred mode of operation, the variable control 14 tends to position the fuel pump rack 13 for reduced normal engine power, as described in greater detail below. The valve 16 isolates the fluid inlet 17 from the variable control 14 while the control lever 11 is in its neutral or first gear position. As the transmission control lever 11 is adjusted for operation in second, third or fourth gears, the valve 16 communicates the fluid inlet 17 with fluid outlet lines 18, 19 and 21, respectively. The variable control 14 is conditioned by fluid flow from the various lines to incrementally adjust the governor setting and increase normal engine power as higher drive ratios are established in the transmission.

The variable control 14 which is responsive to the valve 16 includes a piston 22 reciprocably mounted within a bore 23 defined by a housing 24. Leftward movement of the piston 22, as seen in FIG. 1, is limited by an adjustable screw 25. Rightward motion of the piston 22 is limited by a stop member 24 arranged within an internal bore 26 of the piston 22 and penetrating the piston to be secured to the housing 14. The piston 22 is associated with the fuel pump rack 13 by means of a link 27 which is maintained in alignment with the piston 22 by a dowel 28. The link 27 has an arm 29 which is mounted upon the end of a sleeve 31. The sleeve 31 slidably penetrates a bushing 32 which forms an opening in the governor housing 33 adjacent a stop 34 mounted on the end of the fuel pump rack 13. An elongated member or rod 36 is mounted within the sleeve 31 with its left end penetrating the arm 29 of the link 27. Adjusting nuts 37 are threaded onto the rod 36 and act against a resilient stop 38 which is secured to the arm 29. The right end of the rod 36 penetrates the stop 34 on the fuel pump rack and has a shoulder 39 for limiting rightward shifting of the fuel pump rack. Both the piston 22 and the rod 36 tend to be shifted together toward the leftward limit of the piston 22 by a spring 41 arranged for interaction between the governor housing 33 and a flange 42 formed on the sleeve.

To sequentially shift the piston rightwardly and incrementally adjust the rightward limit for the fuel pump rack, the inlet lines 18, 19 and 21 are respectively communicated with the piston bore 23 by means of inlet ports 18a, 19a and 21a which are sequentially arranged relative to the axis of the piston 22. The arrangement of the inlet ports is best seen in FIG. 2.

The piston 22 is formed with an annular groove 51 which is at least partially open to each of the inlet ports 18a, 19a and 21a when the piston 22 is in its leftward-most position as shown in FIG. 1. An internal passage 52 in the piston 22 communicates the annular groove 51 with a cavity 53 maintained between the left end of the piston 22 and the housing 24 by the adjustable screw 25.

Fluid entering the annular groove 51 from any of the inlet ports is communicated to the cavity 53 and shifts the piston 22 rightwardly until the leftward edge 54 of the annular groove 51 tends to close off the respective inlet ports so that the piston 22 substantially achieves equilibrium in that position. Accordingly, as the transmission control 11 is shifted into second gear and fluid enters the annular groove 51 from the fluid inlet 18, the piston 22 is shifted rightwardly until the annular edge 54 just closes off the inlet port 18a. As the transmission control lever 11 is shifted into third gear, fluid is introduced into the annular groove through the fluid inlet 19 so that the piston 22 similarly achieves an equilibrium position with its annular edge 54 just blocking the inlet port 19a. Similarly as the transmission control lever 11 is shifted into fourth gear, fluid entering the annular groove 51 from the inlet 21 causes the piston to achieve an equilibrium position in which its annular edge 54 tends to close off the inlet port 21a. The piston 22 is thus sequentially shifted to the right in incremental amounts as the transmission control lever is positioned for second, third and fourth gear operation, respectively. The piston 22 acts upon the link 27 and shifts the sleeve 31 against the spring 41 so that the rod 36 permits incremental adjustment of the fuel pump rack 13 to the right which results in incremental increases in normal engine operating power. When the control lever 11 is again positioned in either neutral or first gear, fluid from the cavity 53 is forced through a small orifice 56 in the piston 22 and permitted to return to the engine or to drain through an opening 57 in the housing 24. The spring 41 then repositions the rod 36 and piston 22 toward the leftward limit of the piston against the screw 23.

An alternate embodiment of the invention, as illustrated in FIG. 3, is also adapted to adjust the governor power setting in response to a transmission control lever and associated valve similar to those indicated at 11 and 16, respectively, in FIG. 1. Components in FIG. 3 which are similar to those in FIG. 1 are indicated by primed numerals. Having reference also to FIG. 4, the major variation from the embodiment of FIG. 1 resides in the use of a plurality of pistons, such as the three pistons indicated at 61, 62 and 63 in FIG. 4, with one or more of the pistons acting upon a pivotal member 64 to incrementally adjust the fuel pump rack 13'.

In this embodiment, the link 27' abuts a member 66 which is slidably supported by the housing 24' and has a tapered end 67 extending into a housing 68 which forms an extension of the housing 24'. The piston 63 is reciprocably mounted in a bore 69 formed by the housing 68 and has a tapered end 71 adjacent the pivotal member or plate 64. An adjustable screw 72 penetrates the housing 68 to provide a limit for leftward motion of the piston 63, as seen in FIG. 3, and to maintain a cavity 73 between the left end of the piston 63 and the housing 68. The fluid outlet 18 for the valve 16 of FIG. 1 is in communication with the cavity 73 by means of an inlet port 74. The other two pistons 61 and 62 are similarly arranged in separate bores within the housing 68 in respective communication with the fluid outlets 19 and 21 of the valve 16 of FIG. 1.

The valve 16 (see FIG. 1) operates in conjunction with the variable control 14' of FIG. 3 in a generally similar manner as described above. When the control lever 11 is positioned in neutral or first gear, hydraulic fluid in the inlet line 17 is prevented from communicating with the variable control 14'. When the transmission control lever 11 is shifted into second gear, fluid is communicated to the cavity 73 behind the piston 63 through the conduit 18. The piston 63 is shifted rightwardly against the wobble plate 64 to extend the rod 36' rightwardly and permit incrementally increased rightward shifting of the fuel pump rack 13'. As the transmission control lever 11 of FIG. 1 is shifted into third gear, fluid is communicated through both of the conduits 18 and 19 so that both of the pistons 63 and 61 are shifted rightwardly against the plate 64 to permit still further rightward shifting of the fuel pump rack 13'. As the transmission control lever 11 of FIG. 4 is shifted into fourth gear, fluid is communicated through all three of the outlet conduits 18, 19 and 21 so that all three of the pistons 61, 62 and 63 are shifted rightwardly against the plate 64 to permit maximum rightward shifting of the fuel pump rack 13' for maximum normal engine power.

To increase normal engine power in equal increments as the transmission control lever 11 of FIG. 1 is shifted from first gear to second gear, second gear to third gear and third gear to fourth gear, the three pistons 61, 62 and 63 are preferably arranged to act upon the plate 64 in equal circumferential and radial spacing relative to the pivot axis for the plate 64.

What is claimed is:

1. Variable control apparatus associated with a governor for establishing normal engine operating power and a transmission capable of varying the output drive ratio for the engine, the governor including a movable fuel pump rack bar, comprising a movable member associated with the governor to adjust its power setting, the movable member being coupled to the rack bar by stop means to permit adjustment of the rack bar by the governor within a limit positively established by the movable member, motor means associated with the movable member and the transmission for shifting the movable member and varying normal engine power in response to transmission drive ratio selection, the motor means comprising piston means reciprocably disposed in a housing for acting upon the movable member in response to fluid pressure, spring means for resisting movement of the member by the piston means, and a valve operable by control means for the transmission, the valve being effective to selectively communicate fluid under pressure to the piston means through a plurality of conduits, fluid inlets for each of the conduits being incrementally arranged within the housing relative to a longitudinal axis of the reciprocable piston means, the piston being responsive to fluid flow from the respective conduits to achieve an equilibrium position relative to the inlet for each conduit and position the movable member and stop means for varying the positive limit within which the rack bar is adjustable by the governor.

2. The invention of claim 1 further comprising means for bleeding fluid from the piston housing.

3. Variable control apparatus associated with a governor for establishing normal engine operating power and a transmission capable of varying the output drive ratio for the engine, comprising a movable member associated with the governor to adjust its power setting, motor means associated with the movable member and the transmission for shifting the movable member and varying normal engine power in response to transmission drive ratio selection, the motor means comprising piston means reciprocably disposed in a housing for acting upon the movable member in response to fluid pressure, spring means for resisting movement of the member by the piston means, a valve operable by control means for the transmission, the valve being effective to selectively communicate fluid under pressure to the piston means through a plurality of conduits, the piston means being responsive to fluid flow from the respective conduits to shift the movable member and incrementally adjust normal engine speed established by the governor, the plurality of conduits being associated with the piston means, and fluid communication through the conduits being responsive to the transmission control means for permitting the piston means to regulate the governor in order to increase engine operating power as the transmission control means is adjusted for a higher speed ratio;

the piston means comprising at least two pistons reciprocably mounted in respective bores with each of the conduits being in communication with one of the bores, the pistons acting against a pivotal member mounted on the movable member, the valve being operable to introduce fluid under pressure into one or both of the conduits, the pivotal member being a wobble plate, the piston means comprising three pistons with three of the conduits being in respective communication with the three piston bores, the control means being effective for preventing fluid flow at least when the transmission is in neutral and for communicating fluid into one, two or three of the conduits as the control means is respectively adjusted to increase the transmission drive ratio.

4. The invention of claim 3 wherein the three pistons are arranged for equal radial and circumferential interaction with the wobble plate relative to its pivot point with the movable member so that the movable member is shifted in equal increments by sequential actuation of the pistons.

5. The invention of claim 3 wherein the governor includes a movable fuel pump rack bar, the movable member being coupled to the rack bar by stop means to permit adjustment of the rack bar by the governor within a limit positively established by the movable member.

References Cited

UNITED STATES PATENTS

| | | | |
|---|---|---|---|
| 860,434 | 7/1907 | Anderson | 91—357X |
| 2,321,264 | 6/1943 | Turner | 91—357X |
| 2,563,834 | 8/1951 | Gillespie | 91—453X |
| 2,719,437 | 10/1955 | Nallinger | 74—860 |
| 2,909,078 | 10/1959 | Nallinger | 74—860 |
| 2,931,340 | 4/1960 | White | 91—413X |
| 3,408,899 | 11/1968 | Golden | 91—357 |

FOREIGN PATENTS

| | | | |
|---|---|---|---|
| 671,103 | 2/1939 | Germany | 91—357 |
| 597,643 | 5/1960 | Canada | 74—860 |

CARLTON R. CROYLE, Primary Examiner

T. C. PERRY, Assistant Examiner

U.S. Cl. X.R.

91—357, 410